Figure 1:
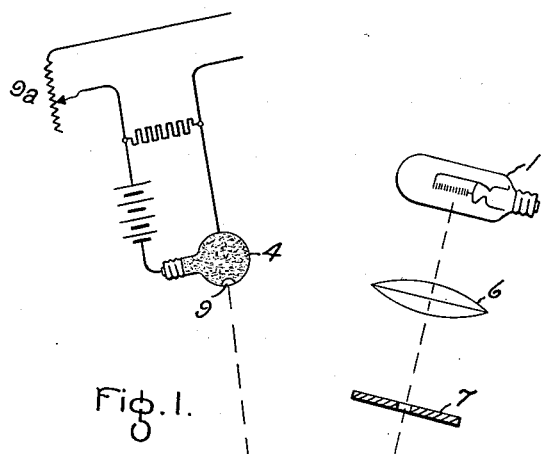

Feb. 17, 1931.  J. HUTT  1,793,403
SOUND REPRODUCING APPARATUS
Filed Dec. 29, 1927

Inventor:
Joseph Hutt,
by *Alexander S. ...*
His Attorney.

Patented Feb. 17, 1931

1,793,403

UNITED STATES PATENT OFFICE

JOSEPH HUTT, OF KENILWORTH, ENGLAND, ASSIGNOR TO GENERAL ELECTRIC COMPANY, A CORPORATION OF NEW YORK

SOUND-REPRODUCING APPARATUS

Application filed December 29, 1927, Serial No. 243,425, and in Great Britain January 11, 1927.

My present invention relates to sound reproducing apparatus and particularly to devices commonly known as "pick-up" devices, which are utilized for converting records of sound waves, such as gramophone records, into corresponding varying electric currents for the purpose of actuating electro-magnetic or electro-dynamic sound-emitting apparatus.

"Pick-up" devices of this description have commonly consisted of a winding which was oscillated in a magnetic field in accordance with vibrations transmitted to a moving element, such as a stylus, from the record. The varying electric currents induced in the winding were then amplified, if necessary, and conveyed to the sound-emitter.

In accordance with the present invention, the "pick-up" is arranged to be actuated by the record so as to cause the intensity of illumination of a photo-electric or light sensitive element to be varied in accordance with the recorded sound waves. This may be effected in many ways. In one arrangement the stylus is adapted to cause the movement of a small mirror, which thereby oscillates a beam of light from a suitable source, so that the beam falls upon the photo-electric or light sensitive element. The mirror may be carried by a suitable pivoted needle arm so that the mirror vibrates in accordance with the movement imparted to the needle by the record. The illumination of the element is thus caused to vary in accordance with the oscillations recorded on the record. The light sensitive element may be closed in a casing having an aperture upon which the beam falls, or if a photo-electric cell is employed the walls of the cell may be opaque with the exception of a transparent window.

As an alternate arrangement, the mirror may be replaced by the light-sensitive element itself, which is vibrated so that the light from the source is caused to fall upon the cell with varying intensity. In one construction, a light sensitive element of the selenium type having a plane surface, is arranged so that the plane surface is at an acute angle to the incident beam of light. The vibrations imparted to the stylus alter the angle of the cell with respect to the beam and consequently vary the intensity of illumination thereof.

The effect may be increased by locating in front of the cell means for varying the light falling upon the cell as the angle of the face of the cell is varied. For example, a grid consisting of a number of thin parallel plates arranged perpendicular to the face of the cell may be attached to the cell so as to move with it, the light passing through the grid depending on the angle between the plates and the beam. Alternatively, the grid may be replaced by a perforated screen, the light passing through the perforations depending in a similar manner upon the angle between the screen and the beam of light. A further modification consists in utilizing a prism of transparent medium with one face attached to the face of the cell, the arrangement being such that as the cell is vibrated the light falling upon the prism is at one time totally refracted, and at another time reflected from an inner face of the prism so as to fall upon the cell. The illumination of the cell is thereby varied in accordance with the vibrations imparted to the cell through the stylus.

In order that the invention and the constructional forms hereinbefore referred to may be fully understood, reference is directed to the following description of the accompanying drawing.

Figure 2:
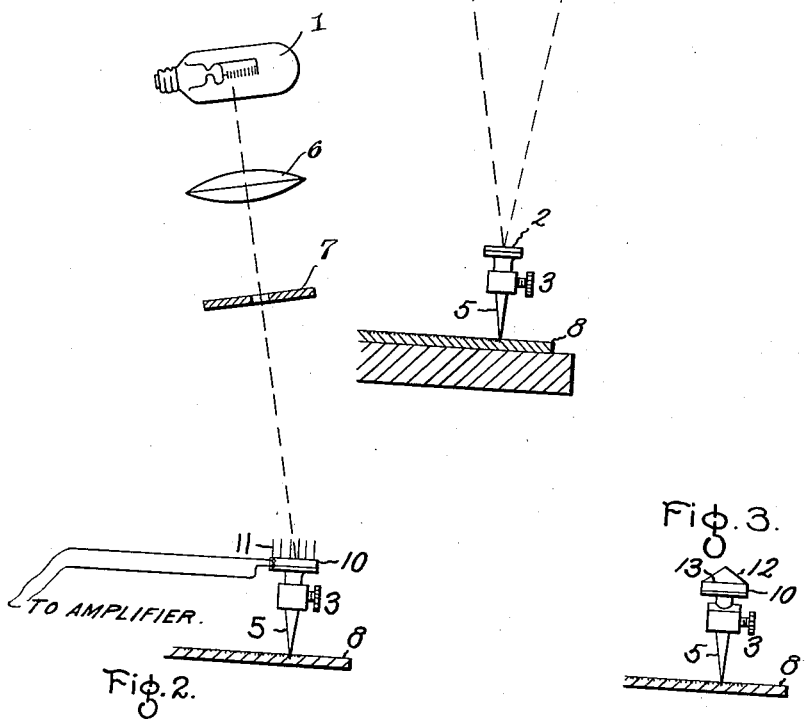
Figure 3:
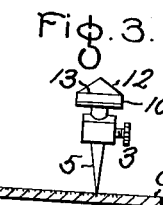

Referring to the drawings, Fig. 1 shows a sound producing apparatus wherein my invention has been embodied; and Figs. 2 and 3 show different modifications of the apparatus illustrated by Fig. 1.

Fig. 1 of the drawing shows diagrammatically a sound reproducing apparatus in accordance with the invention in which a beam of light from a source 1 is reflected from a mirror 2, forming part of a "pick-up" device 3, so as to fall upon a photo-electric element, shown as a cell 4, the illumination of the cell being varied as the beam of light is vibrated in accordance with the oscillations imparted to the mirror 2 by means of the stylus 5. The source 1, shown as an electric incandescent projection lamp, is formed into a pencil of rays by means of the lens 6 and screen 7.

The output from the photo-electric cell 4 may be amplified in any suitable manner, for example, by means of a thermionic valve amplifying system, the output of which is taken to a sound emitting device such as a loud speaker. The beam of light reflected from the mirror 2 is vibrated in accordance with the oscillations imparted to the stylus 5 by the record 8 and thereby the illumination of the electrodes of the device 4 is varied. The cell 4 may consist of an electrode of potassium or sodium enclosed within a bulb containing a low pressure of rare gas, the inner surface of the bulb being obscured, with the exception of a transparent window 9 through which the incident rays pass. Such cells are well known and do not require any further description here. In order to vary the volume of sound emitted by the loud speaker, a potentiometer 9a may be included in the input circuit of the amplifier so that the strength of the current supplied to the input circuit may be varied.

An alternative form of "pick-up" is diagrammatically illustrated in Fig. 2, in which a slab 10 of light sensitive material, such as selenium is attached to the "pick-up" device in such a manner as to be vibrated by the stylus 5. A beam of incident light from a suitable source falls at an angle on the surface of the selenium, and as the selenium is vibrated, the intensity of its illumination is varied in accordance with the sound waves recorded on the record 8. The light system for the selenium element 10 may comprise an electric incandescent projection lamp 1, lens 6 and screen 7, similar to these parts as shown in Fig. 1. It will be readily understood that the selenium cell 10 may be associated with any well known current source and amplifying system, which may be connected to a sound emitting device in a manner similar to that described in connection with photo-electric cell 4 illustrated in Fig. 1. In order to intensify the variations in illumination of the selenium, a screen 11, consisting of a number of parallel plates arranged perpendicularly to the surface of the selenium may be attached thereto. The shadows thrown on the selenium by the plates of the screen 11 vary in length, as the angle between the face of the selenium and the incident light is varied, and consequently the illumination of the selenium is varied. The electric current variations produced, owing to the varying illumination of the selenium, may then be amplified and conveyed to the sound emitter as previously indicated.

Fig. 3 shows a further modification in which a prism 12 of transparent material, such as glass or quartz, is affixed to the face of the selenium 10. Light from a suitable source is arranged to fall on the prism at such an angle that as the solenium is vibrated, light is alternately refracted through the prism, so as to fall upon the face of the selenium 10 and totally reflected from the surface 13 of the prism, thereby varying the illumination of the selenium.

The modification illustrated in Figs. 2 and 3 are purely diagrammatic, and it is to be understood that any suitable form of mounting for the selenium cell may be used in these modifications whereby the vibrations imparted to the stylus from the record, are passed on to the cell. It is also evident that the source of light and the photo-electric element must be mounted on a common support so as to maintain the correct relative positions of these parts independently of the movement of the stylus across the sound record.

The advantage of the present "pick-up" devices reside in the feature that the mirror or the selenium cells attached to the needle mechanism can be made very small and light, and the necessity for small mechanical clearances in the construction is avoided.

What I claim as new and desire to secure by Letters Patent of the United States, is:

1. The method of producing sound from a record thereof which consists in projecting a beam of light on a light sensitive element, moving said light sensitive element in accordance with the contour of said record, the angle of incidence of said beam being such that the intensity of illumination of said element is varied in accordance with the movement of said element, and actuating an electric sound emitting device, by means of the fluctuating currents produced through movement of said light sensitive element.

2. In a pick-up device, a stylus adapted to be actuated by a sound record, and a light sensitive element arranged to be oscillated in accordance with the vibrations imparted to the stylus.

3. In a pick-up device as claimed in claim 2, a grid, consisting of a number of thin parallel opaque plates, arranged in front of the element, with the plates perpendicular to the face thereof.

4. In a pick-up device as claimed in claim 2, means arranged in front of the element for intensifying the effect of the variations in illumination of the element.

In witness whereof, I hereunto set my hand this second day of December, 1927.

JOSEPH HUTT.